United States Patent [19]
Kirsch

[11] Patent Number: 5,870,546
[45] Date of Patent: Feb. 9, 1999

[54] METHOD AND APPARATUS FOR REDIRECTION OF SERVER EXTERNAL HYPER-LINK REFERENCE

[75] Inventor: Steven T. Kirsch, Los Altos, Calif.

[73] Assignee: Infoseek Corporation, Sunnyvale, Calif.

[21] Appl. No.: 999,727

[22] Filed: Dec. 23, 1997

Related U.S. Application Data

[63] Continuation of Ser. No. 604,468, Feb. 21, 1996, Pat. No. 5,751,956.
[51] Int. Cl.[6] ..................................................... H04N 1/413
[52] U.S. Cl. ............................... 395/200.33; 395/200.49; 395/200.68
[58] Field of Search ......................... 395/200.33, 200.47, 395/200.49, 200.57, 200.61, 200.68

[56] References Cited

U.S. PATENT DOCUMENTS 4,825,354  4/1989  Agrawal et al. ........................... 707/10

*Primary Examiner*—Thomas Peeso
*Attorney, Agent, or Firm*—Fliesler, Dubb, Meyer & Lovejoy

[57] ABSTRACT

A Web server computer system provides for server based controlled management over a client reference to a resource locator independently selected by a client computer system and referencing a server external Web server. The Web server system provides a client system with a predetermined URL reference to the Web server system encoded with predetermined redirection and accounting data including a reference to a second server system. On receipt by the first Web server system of the predetermined URL reference from said client system, the predetermined redirection and accounting data is decoded from the predetermined URL and processed by the Web server system to provide the client system with a redirection message including the reference to said second server system. The accounting data is processed by the Web server system and resulting data is selectively stored by the Web server system.

39 Claims, 2 Drawing Sheets

METHOD AND APPARATUS FOR REDIRECTION OF SERVER EXTERNAL HYPER-LINK REFERENCE

This application is a continuation of Ser. No. 08/604,468 filed on Feb. 21, 1996, now U.S. Pat. No. 5,751,956.

CROSS-REFERENCE TO RELATED APPLICATIONS

The present application is related to the following Application, assigned to the Assignee of the present Application:

1) IMPROVED WEB SCAN PROCESS, invented by Kirsch, [Attorney Docket Number: INFS1003DEL/GBR], application Ser. No. 08/604,584 filed concurrently herewith and;

2) Secure convenient and efficient system and method of performing tran-internet purchase transactions, invented by Kirsch, [Attorney Docket Number: INFS1004DEL/GBR], application Ser. No. 08/604,507, filed concurrently herewith.

BACKGROUND OF THE INVENTION

1. Field of the Invention:

The present invention is generally related to the control of network information server systems supporting World Wide Web based data pages and, in particular, to a server system and process for efficiently redirecting external server hyper-link references for purposes of controlling, moderating, and accounting for such references.

2. Description of the Related Art:

The recent substantial growth and use of the internationally connected network generally known as the Internet has largely been due to widespread support of the hypertext transfer protocol (HTTP). This protocol permits client systems connected through Internet Service Providers (ISPs) to access independent and geographically scattered server systems also connected to the Internet. Client side browsers, such as Netscape Mozilla and Navigator (Netscape Communications Corp.) and NCSA Mosaic, provide efficient graphical user interface based client applications that implement the client side portion of the HTTP protocol.

Server side application programs, generically referred to as HTTPd servers, implement the server side portion of the HTTP protocol. HTTP server applications are available both commercially, from companies such as Netscape, and as copyrighted freeware available in source code form from NCSA.

The distributed system of communication and information transfer made possible by the HTTP protocol is commonly known as the World Wide Web (WWW or W3) or as simply "the Web." From a client side user interface perspective, a system of uniform resource locators (URLs) is used to direct the operation of a web browser in establishing atomic transactional communication sessions with designated web server computer systems. In general, each URL is of the basic form:

http://<server_name>.<sub-domain.top_level-domain>/<path>

The server_name is typically "www" and the sub_domain.top-level_domain is a standard Internet domain reference. The path is an optional additional URL qualifier.

Specification by user selection of a URL on the client side results in a transaction being established in which the client sends the server an HTTP message referencing a default or explicitly named data file constructed in accordance with the hypertext mark up language (HTML). This data file or web page is returned in one or more response phase HTTP messages by the server, generally for display by the client browser. Additional embedded image references may be identified in the returned web page resulting in the client browser initiating subsequent HTML transactions to retrieve typically embedded graphics files. A fully reconstructed web page image is then presented by the browser through the browser's graphical user interface.

Due to the completely distributed client/server architecture of the Web, as made possible by the URL system further supported by the existing Internet name resolution services and routing conventions, HTTP servers can be independently established with little difficulty. Consequently, the Web has no centrally or even regionally enforced organization other than loosely by name of the top level domain. Searching for information or other resources provided by individual HTTP servers is therefore problematic almost by definition. Because of the time, cost and complexity of assembling comprehensive, yet efficiently searchable databases of web information and resources, commercial Internet Business Services (IBS) have been established to provide typically fee based or advertising revenue supported search engine services that operate against compilations of the information and resources available via the Web correlated to source URLs. Access to such search engines is usually provided through server local web pages served by the Internet Business Services. The results of a search are served in the form of local web pages with appropriate embedded remote or hyper-linked URLs dynamically constructed by the server of the Internet Business Service.

Because of the opportunity presented by the likely repeated client access and retrieval of search engine and search result web pages, providers of other Internet based services have begun to actively place advertisements on these web pages. As is typical in advertising mediums, the frequency of display of an advertisement generally defines the compensation paid to the advertisement publisher. Thus, the number of times that an advertisement is simply transferred to a client browser provides an indication of how effectively the advertisement is being published. A more direct measure of the effectiveness of a particular advertisement on a particular web page is the number of times a client web browser chooses to actively pursue the URL represented by the advertisement. Thus, there is a need to be able to track information obtainable from a client browser when a hyper-linked advertiser's URL is selected.

The difficulty in obtaining direct reference information arises from the fact that a web page with an embedded advertisement and corresponding remote URL is served in its entirety to the client browser upon first reference to the web page. The selection of a particular advertiser's URL is then by definition performed through an independent transaction directed to the HTTPd server associated with the advertiser. Since the advertiser publishing HTTPd server is not part of this subsequent transaction, the publishing server is conventionally incapable of tracking client browser hyperlinks actually executed to an advertiser's URL or any other URLs embedded in a web page previously served to the client browser.

Simple web page access counters are relatively well known and used throughout the Web. These access counters are based on a common gateway interface (CGI) facility supported by modern HTTPd server systems. The CGI facility permits generally small programs, at least typically in terms of function, to be executed by a server in response to a client URL request. That is, the HTML web page definition provides for the embedding of a specific HTML reference that will specify execution of a server side CGI program as part of the process of the web browser reconstructing an image of a served web page. Such a HTML reference is typically of the form:

<img src="http://www.target.com/cgi-bin/count.cgi">

Thus, a counter value incremented with each discrete execution of the CGI program (count.cgi) dynamically provides part of the displayable image of the reconstructed web page. The time, remote client requester, client domain, client browser type and other information that may be known through the operation of the HTTP protocol may be logged as part of the CGI program's function. Consequently, a reasonable manner of accounting and auditing for certain web page accesses exists.

Access counters, however, fundamentally log only server local web page accesses. The client browser to the CGI program is evaluated by the client in connection with the initial serving of the web page to the client browser. The initial serving of the web page to the client browser can be connected, but any subsequent selection of a URL that provides a hyper-link reference to an external server is not observed and therefore is not counted by a CGI program based access counter. Other limitations of access counters arise from the fact that the implementing CGI program is an independently loadable executable. The CGI program must be discretely loaded and executed by the server computer system in response to each URL reference to the CGI program. The repeated program loading and execution overhead, though potentially small for each individual invocation of the CGI program, can represent a significant if not substantial load to the sever computer system. The frequent execution of CGI programs is commonly associated with a degradation of the effective average access time of the HTTPd server in responding to client URL requests. Since an Internet Business Service providing access to a search engine logs millions of requests each day, even small reductions in the efficiency of serving web pages can seriously degrade the cost efficiency of the Internet Business Service. As of December, 1995, InfoSeek Corporation, in particular, handles an average of five million retrievals a day.

The execution overhead associated with CGI programs is often rather significant. Many CGI programs are implemented at least in part through the use of an interpreted language such as Perl or TCL. Consequently, a substantial processing overhead is involved in multiple mass storage transfers to load both the interpreter and CGI program scripts, to process the scripts through the execution of the interpreter, and then actually log whatever useful data is generated, typically to persistent mass storage. Finally, the interpreter and/or CGI program may have to be unloaded.

In addition, external CGI programs present a significant problem in terms of maintenance, including initial and ongoing server configuration and control, and security in the context of a busy server system. Individual CGI programs will likely be needed for each independent web page in order to separately identify web page service counts. Alternatively, a CGI program can be made sufficient by complex to be able to distinguish the precise manner in which the program is called so as to identify a particular web page and log an appropriately distinctive access count. Maintenance of such CGI programs on a server system where large numbers of page accesses are being separately counted is non trivial.

Further, the existence of external programs, particularly of scripts that are interpreted dynamically, represents a potential security problem. In particular, the access and execute permissions of interpreted scripts must be carefully managed and monitored to prevent any unauthorized script from being executed that could, in turn, compromise the integrity of the data being collected if not the fundamental integrity of the server computer system itself. Consequently, known access counters provide no solution directly in full or in part to the need to account or audit URL references to external servers based on hyper-links from previously served web pages.

The HTTP protocol itself provides for a basic server based system of URL redirection for servers and clients supporting the 1.5 or later versions of the HTTP protocol. A configuration file associated with an HTTP server (typically srm.conf) can specify a redirect directive that effectively maps a server local directory URL reference to an external URL reference through the use of a configuration directive of the form:

Redirect/dir1 http://newserver.widget.com/dir1

When a Version 1.5 or later HTTP server receives a URL reference to a local directory (/dir1) that is specified as above for redirection, a redirect message is returned to the client browser including a new location in the form of an URL (http://newserver.widget.com/dir1). This redirect URL is then used by the client browser as the basis for a conventional client URL request.

This existing server based redirection function is insufficient to support external server access tracking since, in its usual form, the redirection is of the entire directory hierarchy that shares a common redirected base directory. Even in the most restricted form, the redirection is performed on a per directory reference basis. Thus, every access to the directory, independent of the particular web page or graphics image or CGI program that is the specific object of an access request is nonetheless discretely redirected without distinction. Any potential use of the existing server redirect function is therefore exceedingly constrained if not practically prohibited by the HTTP protocol defined operation of the redirect directive.

Furthermore, the redirect directive capability of the HTTP protocol server does not provide for the execution of a CGI program or other executable coincident with the performance of the redirection thereby essentially precluding any action to capture information related to the redirect URL request. In addition, the complexity of the resource configuration file necessary to specify redirection down to a per directory configuration again raises significant configuration, maintenance and, to a lesser degree, security issues. Thus, server redirection does not possess even the basic capabilities necessary to support external URL hyper-link reference auditing or accounting.

Finally, a form of redirection might be accomplished though the utilization of a relatively complex CGI program. Such a redirection CGI program would likely need to perform some form of alternate resource identification as necessary to identify a redirection target URL. Assuming that a unique target URL can be identified, a redirection message can then be returned to a client from the CGI program through the HTTP server as necessary to provide a redirection URL to the client browser.

Unfortunately, any such CGI program would embody all of the disadvantages associated with even the simplest access counter programs. Not only would problems of execution load and latency, as well as configuration, maintenance and security remain, but such an approach to providing redirection is inherently vulnerable to access spoofing. Access spoofing is a problem particular to CGI programs arising from the fact that the HTML reference to the CGI program may be issued without relation to any particular web page. Consequently, any CGI program implementing an access counter or other auditing or accounting data collecting program can produce an artificially inflated access count from repeated reference to the CGI program HTML statement outside and independent of a proper web page. Access spoofing inherently undermines the apparent if not actual integrity of any data gathered by a CGI program. Since, at minimum, the ability to insure the accuracy of even a simple access count would be of fundamental importance to an Internet service advertiser, the use of CGI programs to provide even basic accounting or auditing functions is of limited practical use. Finally, HTML does not provide a tamper-proof way for two URLs to be accessed in sequence with just one URL reference button, such as, for example, a server CGI counter URL reference followed by external server URL reference.

SUMMARY OF THE INVENTION

Thus, a general purpose of the present invention is to provide a system and method of reliably tracking and redirecting hyper-link references to external server systems.

This is achieved by the present invention through the provision of a Web server computer system that provides for server based controlled management over a client reference to a resource locator that is independently selected by a client computer system and that which references an external Web Server. The Web server system provides a client system with a predetermined URL reference to the Web server system, encoded with predetermined redirection and accounting data including a reference to a second server system. On receipt by the first Web server system of the predetermined URL reference from the client system, the predetermined redirection and accounting data is decoded from the predetermined URL and processed by the Web server system to provide the client system with a redirection message including the reference to the second server system. The accounting data is processed by the Web server system and resulting data is selectively stored by the Web server system.

Thus, an advantage of the present invention is that URL reference data is captured in an expedient manner that interposes a minimum latency in returning the ultimately referenced web page while imposing minimum visibility of the redirection protocol on client users.

Another advantage of the present invention is that independent invocations of server external support programs and multiple external data references are not required as a consequence of the present invention, thereby minimizing the CPU and disk intensive load on the web server computer system and the resulting latency.

A further advantage of the present invention is that the reference identifier and redirection directive can both be maintained wholly within the URL specification discretely provided by a client HTML request. Thus, the present invention is superior in both efficiency and maintenance requirements to a CGI counter, or any method that incorporates a CGI counter.

Still another advantage of the present invention is that program modifications necessary to support the protocol of the present invention are implemented entirely at the server end of a protocol transaction. Client side participation in the transaction is within the existing client side defined HTML protocol.

A still further advantage of the present invention is that the implementation of the invention introduces minimum exposure to additional security breaches due to the closed form of the protocol while providing substantial security against inappropriate URL and protocol references. This is accomplished preferably by the inclusion of validation codes inside the URL specification.

BRIEF DESCRIPTION OF THE DRAWINGS

These and other advantages and features of the present invention will become better understood upon consideration of the following detailed description of the invention when considered in connection with the accompanying drawings, in which like reference numerals designate like parts throughout the figures thereof, and wherein.

DETAILED DESCRIPTION OF THE INVENTION

Figure 1:
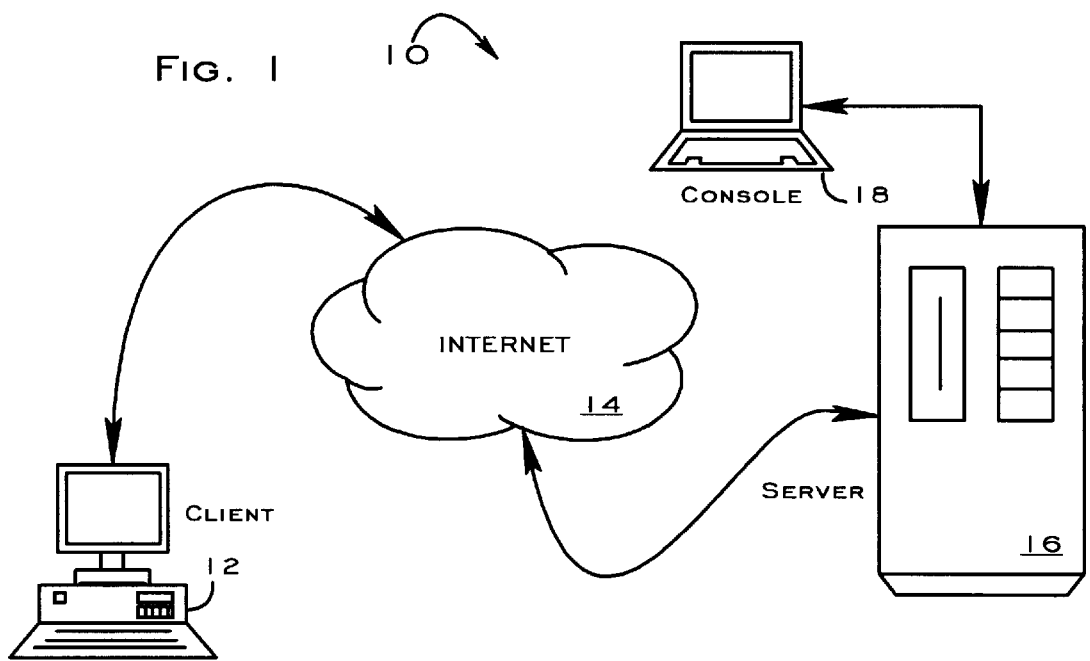
FIG. 1 provides a schematic representation of client and server computer systems internetworked through the Internet.

A typical environment 10 utilizing the Internet for network services is shown in FIG. 1. Client computer system 12 is coupled directly or through an Internet service provider (ISP) to the Internet 14. By logical reference via a uniform resource locator, a corresponding Internet server system 16, 18 may be accessed. A generally closed hypertext transfer protocol transaction is conducted between a client browser application executing on the client system 12 and an HTTPd server application executing on the server system 16. In a preferred embodiment of the present invention, the server system 16 represents an Internet Business Service that supports or serves web pages that embed hyper-link references to other HTTPd server systems coupled to the Internet 14 and that are at least logically external to the server system 16.

A web page served by the server system 16 to the client 12 embeds a URL reference to a web page served by the logically external server system. Selection of this embedded URL through the client browser of the client computer system 12 results in an HTTP transaction with the server system 16 rather than the external server. The information stored in the embedded URL first served with the web page to client system 12 is thus provided back to the server system 16 upon selection of the URL even though the apparent target of the URL is the external server system. A redirection response is then provided by the server system 16 to the client system 12 providing the corresponding redirection URL.

Figure 2:
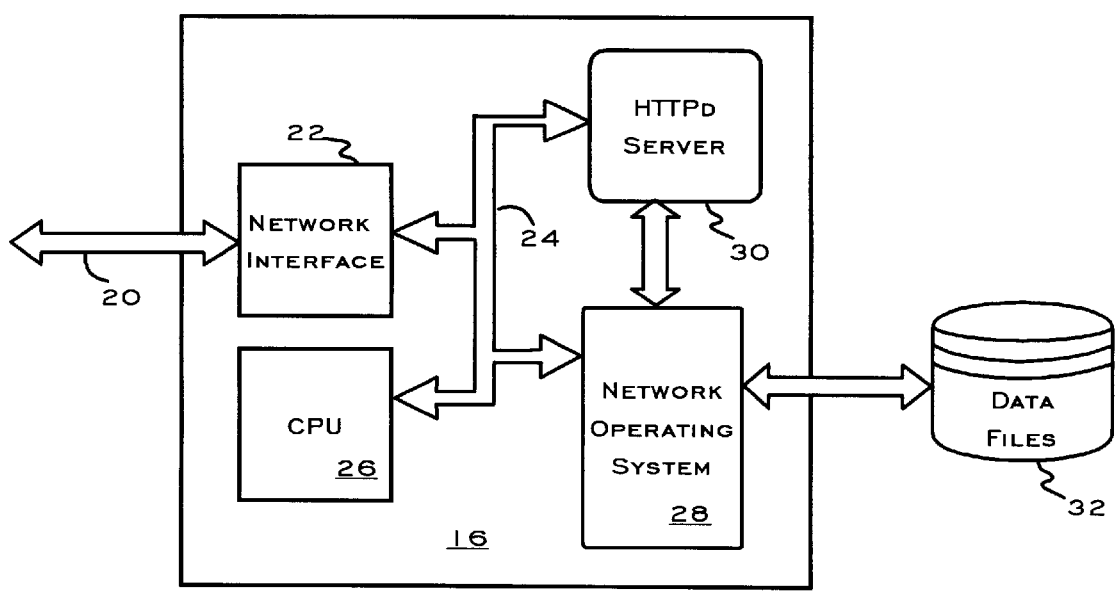
FIG. 2 provides a block diagram of a server computer system implementing an HTTP daemon (HTTPd) server in accordance with a preferred embodiment of the present invention.

As shown in FIG. 2, the server system 16 receives the redirection request information via a network connection 20 to a network interface 22 within the server system 16. The network interface 22 is coupled through an internal bus 24 to a central processing unit (CPU) 26. The CPU 26 executes a network operating system 28 in support of the network interface 22 and other functional aspects of the server system 16. The network operating system 28 supports the execution by the CPU 26 of an HTTPd server application 30 that defines the responsive operation of the server system 16 to HTTP requests received via the network 20. Finally, the network operating system 28 provides for temporary and persistent storage of data in a mass storage device 32 preferably including a persistent storage media such as provided by a conventional hard disk drive.

In accordance with the preferred embodiment of the present invention, the embedded redirection information provided as part of a URL HTTP request is processed by the HTTPd server 30. Preferably, the processing by the HTTPd server 30 is performed through the execution of the server 30 itself as opposed to the execution of any external CGI programs or the like. The redirection information is processed by the execution of the server 30 to identify and validate the particular URL reference that provided the redirection information and to generate a redirection target URL.

In a preferred embodiment of the present invention, an embedded URL containing redirection information is formatted as follows:

http://<direct_server>/redirect?<data>?http://<redirect_server>

The direct_server portion of the embedded URL specifies the HTTP server target of a transaction that is to be initially established by the client system 12. The remaining information is provided to the targeted direct server. While the direct server may be any HTTP server accessible by the client system 12 that has been designated to service redirection requests in accordance with the present invention, the direct server is preferably the HTTPd server 30 that initially served the web page with the embedded redirection URL to the client system 12.

The term "redirect" in the embedded redirection URL is a key word that is pre-identified to the HTTPd server 30 to specify that the URL corresponds to a redirection request in accordance with the present invention. Although the term "redirect" is the preferred term, any term or code may be selected provided that the term can be uniquely identified by the HTTPd server 30 to designate a redirection URL.

The "data" term of the redirection URL provides data to the HTTPd server 30 that can be used to further identify and potentially validate a redirection URL to the HTTPd server 30. In the context of an advertisement, the data may encode a particular advertising client for whom access data may be kept, a particular instance of the graphic image provided to a client system 12 in association with the redirection URL, and potentially a validation code that may serve to ensure that inappropriate client uses of a redirection URL can be distinguished and discarded by the HTTPd server 30.

An exemplary redirection URL, constructed using HTML in accordance with a preferred embodiment of the present invention, is as follows:

<a href="http://www.infoseek.com/IS/redirect?NwPg-003-AA?http://www.newspage.com">

Within the redirection data, the data component "NwPg" serves as a client or account identifier. The data component "003" is a series identifier indicating a particular graphic image that was associated with the redirection URL as embedded in the web page served to the client system 12. Finally, the data component "AA" may be utilized to provide a basic validation identifier that serves to permit the HTTPd server 30 to identify inappropriate repeated submissions of the redirection URL to the server system 16 or those that are determined to be obsolete by convention.

In an alternate embodiment of the present invention, the validation data encodes a data representation that can be used in conjunction with the HTTP protocol to provide information regarding the client system 12 that submitted the redirection URL and, optionally, the graphics series identifier data, to limit repeated use of the redirection URL by the same client system 12 within a defined short period of time. Thus, an inappropriate attempt by a third party client to, in effect, tamper with the data collected by the server system 16 with respect to any particular redirection URL can be identified with relative if not complete certainty and blocked. In addition, date codes older than a certain time interval can be declared by computation to be invalid. Consequently, a copy of the embedded redirection URL cannot be stored on a client system 12 and remain viable for use for longer than a period of time defined exclusively by the server computer system 16.

Each of the data terms within a redirection URL may be statically or dynamically created by the HTTPd server 30 as part of the process of originally serving a web page with the embedded redirection URL to a client computer system 12. With dynamic generation, different graphic images corresponding to a single advertiser or one of any number of advertisers may be effectively served with an otherwise statically defined web page. The data terms of the embedded redirection URL may be dynamically selected based on the identity of the advertiser and graphics image in addition to separately establishing a hypertext link to the graphics image as part of an instance of serving a particular web page by the HTTPd server 30. Indeed, the selection of advertiser and graphics image could be made at least in part on the identity of the client computer system 12 as established through information provided by the conventional operation of the HTTP protocol, and on the client profile if known.

The validation code may also be dynamically generated. In an alternate embodiment of the present invention, the validation code encodes a representation of the day of the year with the account and image identifier data terms to generate an identifier, preferably encoded as two digits, that provides a sufficient degree of uniqueness to allow an embedded redirection URL to be aged on a per day basis. Furthermore, the validation code remains constant on a per day basis and thereby still permits the number of references on a per day per specific client system 12 basis to be tracked by the HTTPd server 30 so as to limit the frequency that a specific instantiation of the web page is repeatedly presented to a specific client 12. Additionally, the HTTPd server 30 may operate to block operation on a received redirection URL where the corresponding web page has not recently been served to the requesting client 12.

Various bit shift, check sum, and modulo arithmetic algorithms can be utilized to generate the validation code in a consistent manner known to the HTTPd server 30, but that cannot be readily discerned upon examination of the resulting redirection URL by a specific client computer system 12. Alternately, the validation code may be an arbitrarily selected value that is implicitly recognized as valid by the HTTPd server 30 for a programmable period of time from one day to several weeks or longer. In the extreme, and consistent with the initially preferred embodiment of the present invention, the validation code is a static value provided as part of the embedded redirection URL.

Independent of the particular manner the validation code is generated or the assigned length of time that the code is recognized by the HTTPd server 30 as valid, evaluation of the data terms of a redirection URL is preferably performed completely internally to the HTTPd server 30. The data terms are preferably sufficiently complete as to be unambiguous in identifying a particular instantiation of an embedded redirection URL without significant, if any, resort to the loading and execution of an external program or even significantly to interrogate look up files stored by the persistent storage device 32. Consequently, the burden of evaluating a redirection URL in accordance with the present invention is almost completely computational in nature. As is conventionally appreciated, the performance of a server computer system 16 is not typically computationally bound, but rather bound by the rate of input/output (I/O) access to the persistent storage device 32 and to the network 20. By substantially if not completely limiting the evaluation of the redirection URL to a computational operation, with only a limited I/O operation to save auditing or accounting data obtained in connection with a redirection URL, an optimally minimal burden on the server computer system 16 is realized by the operation of the present invention. Indeed, the saving of accounting or auditing data may be cached by the network operating system 28 to defer the write I/O operation to the persistent storage device 32 until otherwise excess I/O bandwidth is available in the ongoing operation of the server computer system 16.

The final portion of the preferred structure of a redirection URL is a second URL. This second URL preferably identifies directly the target server system for the redirection. Preferably, any path portion provided as part of the direct server specification of the redirection URL is repeated as a path component of the redirect server portion of the redirection URL. However, path portion identity is not required. In general, all that is required in accordance with the present invention is a one to one correspondence between the direct server and redirect server terms of the redirection URL. A less strict relationship may be used if the impact upon the auditing or accounting data collected by the operation of the present invention is consistent with the desired characteristic of that data. For example, different direct server specifications may correlate to the use of a common redirect server as a means of further identifying a particular instantiation of an embedded redirection URL. Alternately, otherwise identical instantiations of an embedded redirection URL may reference any of a number of redirect servers. This may be done to distribute load on the cooperatively operating redirect servers or to provide a means for verifying the auditing or accounting data collected by the ongoing operation of the present invention. Indeed, the second URL of a redirection URL can itself be a redirection URL, though care needs to be taken not to create an infinite redirection loop.

Figure 3:
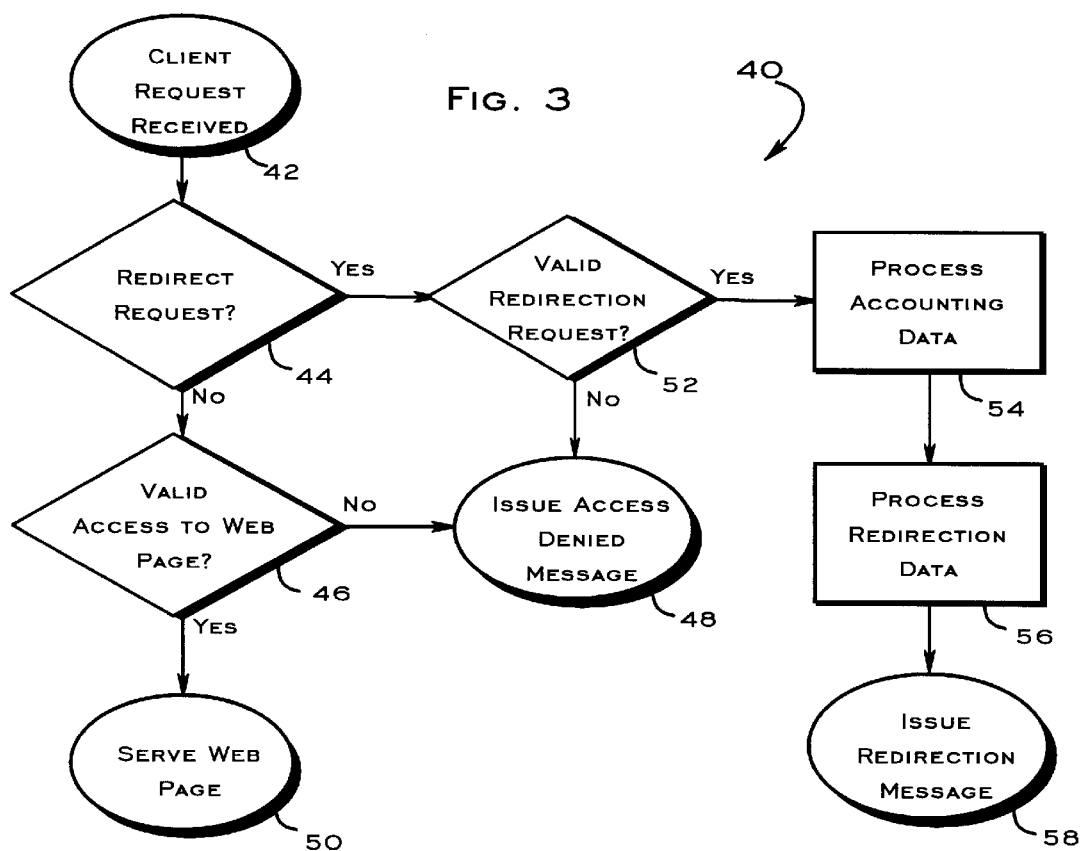
FIG. 3 provides a flow diagram illustrating the process performed by a preferred embodiment of the present invention in receiving and processing client URL requests.

A preferred method 40 of processing redirection URLs provided to a server computer system 16 by a client computer system 12 is illustrated in FIG. 3. As each client request is received 42 the data provided as part of the request is examined to determine whether the request embeds the redirect key word 44. If the URL data does not specify a redirection request consistent with the present invention, the URL data is checked 46 to determine whether the URL data conventionally specifies an existent local web page. If the web page does not exist or, based on the client identification data provided via the HTTP protocol in connection with the URL client request, the particular client is not permitted access to the existent web page, the HTTPd server 30 determines a corresponding error message 48 that is returned to the client computer system 12. Otherwise, the HTTPd server 30 proceeds and serves the local web page 50 to the client computer system 12.

Where URL data at least specifies a redirection request 52, the URL data is further checked for validity. A table of valid combinations of client and graphic image identifiers, preferably cached in memory in the server system 16, may be used to initially establish the validity of the redirection request. The validation code may either be checked by recalculation based on the provided redirection data or checked against another table of validation codes that are current. In either event, the relative timeliness of the redirection request can be determined from the age of the validation code and therefore serve as basis for determining whether the current redirection request is timely or suspect. Furthermore, additional checks may be performed to verify that the corresponding web page has indeed been served recently by the server computer system 16 to the particular requesting client computer system 12 based on a short term log of local web pages actually served by the server computer system 16. Finally, access permissions enforced by the server computer system 16 can be checked against the identification of the client computer system 12 to categorically limit redirection to defined classes of clients. Where the request is determined to be invalid for any reason, an appropriate denial message is generated and issued 48.

Where a redirection request is determined valid, any or all of the data provided as part of the redirection request or provided to the HTTPd server 30 through the conventional operation of the HTTP protocol can be logged through the network operating system 28 to the persistent storage device 32 for subsequent manipulation, analysis and reporting. The redirection request is then further processed to obtain the second URL identifying the target redirection server 56. This second URL is then specified in the location field of a redirection message, preferably a temporary redirection message, that is issued 58 back to the client computer system 12 that issued the redirection URL initially.

The process 40 in accordance with a preferred embodiment of the present invention, is performed essentially entirely within the HTTPd server 30. The implementation of the process 40 can be performed through a modification and extension of the processing flow implemented by the HTTPd server 30, through a corresponding modification of the server source code. These modifications and additions may be made utilizing conventional programming techniques.

Figure 4:
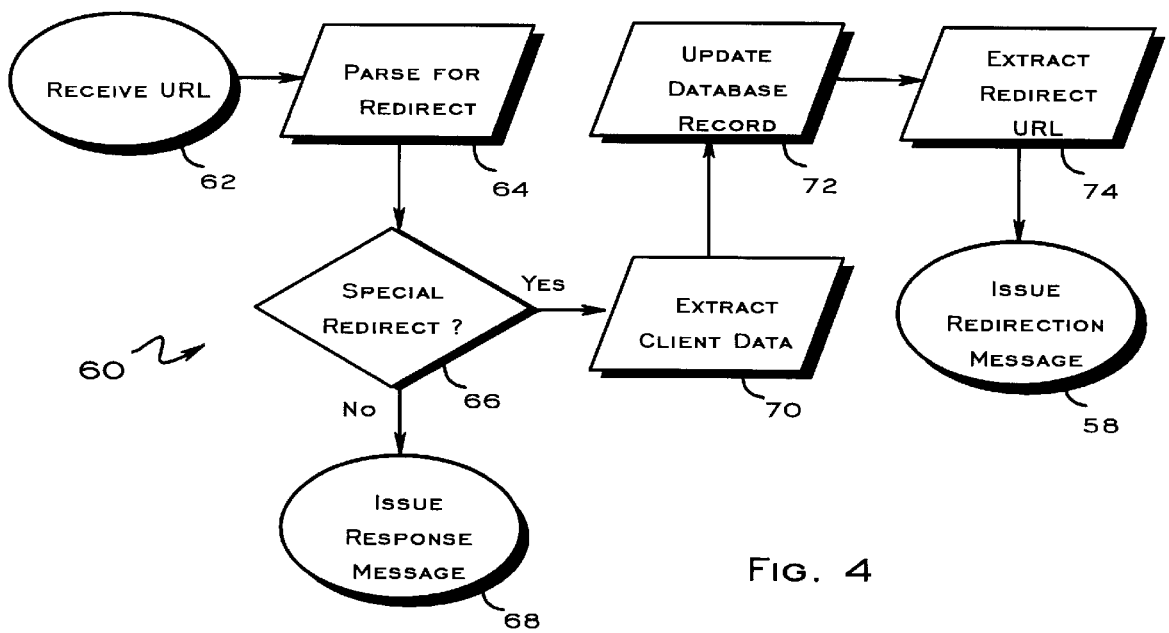
FIG. 4 provides a flow diagram illustrating the server side processing of special redirect URLs in accordance with another preferred embodiment of the present invention.

The redirection capability provided by the present invention is fully consistent with existent de-facto standard redirection capabilities provided by conventional HTTPd servers. A further detailed portion 60 of the process 40 is shown in FIG. 4. Within the operation of the HTTPd server 30, the URL data 62 is received and initially parsed 64 to identify the appropriate existence of the redirect key word. Where the specific form of the redirection URL of the present invention is not identified 66, the URL is further processed in a conventional manner to determine whether any other form of redirection is applicable. In addition, an evaluation of conventional access privileges to a local web page where no conventional redirection is specified can also be performed with, ultimately, an appropriate response message being issued 68.

In the specific instance where the URL request is of the special redirect form consistent with the present invention, as opposed to conventional HTML redirection capabilities, the URL data is processed 70 and, in combination with the HTTP protocol-provided data identifying the client computer system 12, a database record is created or updated in the persistent mass storage device 32 at 72. The second URL is then extracted 74 and a redirection message, specifically a type 302 temporary redirection message, is prepared. The location field created as part of the redirection message is provided with the target redirection server URL. The redirection message is then issued 58 to the originally requesting client computer system 12.

Thus, a comprehensive system and method for accounting or auditing accesses made by client computer systems to external hyper-linked servers has been described. The auditing capabilities of this system process impose optimally minimal overhead burden on the redirection server system while permitting the data that is gathered to be validated and reasonably assured to correspond to bona fide accesses to a redirection target server system.

While the invention has been particularly shown and described with reference to preferred embodiments thereof it will be understood by those skilled in the art that various changes in form and details may be made therein without departing from the spirit and scope of the invention.

I claim:

1. A method of providing for the server based controlled management and tracking of a client reference to a resource locator independently selected by a client computer system and referencing a server external resource, said method comprising the steps of:
   a) providing to a client system a predetermined URL referencing a first server system, said predetermined URL being encoded with predetermined redirection and accounting data including a reference to a second server system;
   b) receiving by said first server system said predetermined URL from said client system;
   c) decoding by said first server system said predetermined redirection and accounting data from said predetermined URL; and
   d) processing by said first server system said predetermined redirection and accounting data including providing said client system with a redirection message including said reference to said second server system.

2. A server system providing for the serving of data pages, including page elements, in response to hypertext protocol requests received from a network, said server system including a processor for executing a server application to implement a server process comprising the steps of:
   a) receiving a predetermined request from said network, wherein said predetermined request corresponds to a predetermined page element, and wherein said predetermined request includes predetermined request data;
   b) processing said predetermined request data to obtain an identification of said predetermined page element;
   c) preparing a predetermined redirection message corresponding to said identification; and
   d) issuing said predetermined redirection message to said network.

3. The server system of claim 2 further comprising the steps of:
   a) pre-establishing a correspondence between said predetermined page element and said identification, said correspondence providing redirection information for use in said step of preparing said predetermined redirection message; and
   b) serving a predetermined data page including said predetermined page element.

4. The server system of claim 3 wherein predetermined redirection information is provided with said predetermined page element, and wherein said predetermined redirection information is included in said predetermined request.

5. The server system of claim 4 wherein said predetermined redirection information includes first data providing said identification and second data providing a redirection reference, wherein said step of processing includes a step of identifying a redirection server from said redirection reference, and wherein said step of preparing provides said predetermined redirection message with an identification of said redirection server.

6. The server system of claim 5 wherein said redirection reference includes a predetermined URL, and wherein said identification of said redirection server is said predetermined URL.

7. The server system of claim 5 wherein said redirection reference establishes a one-to-one relationship between said predetermined request and said redirection server.

8. The server system of claim 5 wherein said redirection reference establishes a relationship between said predetermined request and any of a plurality of redirection servers, and wherein said step of preparing said predetermined redirection message selects said redirection server from said plurality of redirection servers.

9. A process providing for the collecting information regarding the selection of hyper-text URLs in Web pages served over a network to a client system from a server system, said process comprising the steps of:
   a) serving a Web page, including a predetermined embedded URL, from a first predetermined server system to a client system, wherein said predetermined embedded URL includes predetermined identification data;
   b) receiving by said first predetermined server system a predetermined message from said client system in response to the selection of said predetermined URL, said predetermined message including said predetermined identification data;
   c) recording by said first predetermined server system said predetermined identification data; and
   d) issuing by said first predetermined server system a temporary redirection message to said client system identifying a second predetermined server system.

10. The process of claim 9 wherein said Web page includes a hyper-text object corresponding to said second predetermined server system, and wherein said hyper-text object embeds said predetermined embedded URL.

11. The process of claim 10 further comprising the step of processing said predetermined identification data to obtain first and second data, said first data identifying said hyper-text object and said second data identifying said second predetermined server system.

12. The process of claim 11 wherein said step of issuing includes the steps of forming a predetermined redirection URL based on said second data, and incorporating said predetermined redirection URL in said temporary redirection message.

13. The process of claim 12 wherein said second data includes a portion of said predetermined redirection URL.

14. The process of claim 12 wherein said second data includes a path portion of said predetermined redirection URL and an identification of a Web page available to be served by said second predetermined server system.

15. The process of claim 10 further comprising the step of determining from said predetermined identification data a URL reference to said second predetermined server system.

16. A process permitting the accounting by a server system of hyper-text selection of Web page elements by client systems, said process comprising the steps of:

a) identifying a Web page element with a first predetermined server system so that the identification is visually effective to a user of a predetermined client system;

b) providing a redirection URL as an embedded URL included with said Web page element, said redirection URL including a server URL and data, said direct server URL specifying a second predetermined server system, said data including an identification of said Web page element and a reference to said first predetermined server system; and c) serving a Web page including said Web page element to said predetermined client system, whereby hyper-text selection of said Web page element will provide said data to said second predetermined server system.

17. The process of claim 16 further comprising the steps of:

a) receiving, by said second server system, said data;

b) processing said data to obtain said identification and said reference;

c) storing accounting data corresponding to said identification; and d) providing a redirection message to said predetermined client system including a URL specifying said first predetermined server system.

18. The process of claim 17 wherein said URL specifying said first predetermined server system corresponds to said reference.

19. The process of claim 18 wherein said reference includes said URL specifying said first predetermined server system.

20. The process of claim 16 wherein said redirection URL includes validation data provided to support validation of said redirection URL by said second server system.

21. A process for tracking client selections of hyper-link references comprising the steps of:

a) providing a client computer system with a selectable hyper-link reference to a first server system, wherein selection of said hyper-link reference by said client computer system provides a portion of said hyper-link reference to said first server system; and b) providing, by said first server system, a redirection reference to said client computer system, wherein said redirection reference is determined by said first server system from said portion of said hyper-link reference and wherein said redirection reference includes an identification of a second server system.

22. The process of claim 21 wherein said redirection reference is determined from a correspondence between said portion of said hyper-link reference and said identification.

23. The process of claim 22 wherein said first server system processes said portion of said hyper-link reference to provide said identification.

24. The process of claim 23 wherein said portion of said hyper-link reference includes said identification.

25. The process of claim 21 wherein said portion of said hyper-link reference includes validation information, said process further comprising the step of processing said validation information by said first server system in determining said redirection reference and wherein said redirection reference is conditionally provided to said client computer system.

26. The process of claim 25 wherein said portion of said hyper-link reference includes account information, said process further comprising the step of processing said account information to obtain accounting or auditing data and recording said accounting or auditing data.

27. The process of claim 21 wherein said hyper-link reference is selectively constructed by said first server system to have a predetermined correspondence between said portion of said hyper-link reference and said identification and wherein said predetermined correspondence is determined by said first server system upon receipt of said portion of said hyper-link reference.

28. A process for providing notification of the selection of a hyper-link reference to a first server system in response to selection of a Web page element by a client system where the Web page element corresponds to a second server system, said process comprising the steps of:

a) providing for said hyper-link reference to include a direct server URL reference to said first server system, a redirection directive, and an identification of a second server system, wherein said client system utilizes said direct server URL to provide said redirection directive and said identification to said first server system;

b) processing said redirection directive and said identification to prepare a redirection message including a redirect server URL; and c) providing said redirection message to said client system.

29. The process of claim 28 wherein said identification includes said redirect server URL.

30. The process of claim 29 wherein processing of said identification determines said redirection URL having a predetermined correspondence with said second server system.

31. The process of claim 30 wherein said predetermined correspondence is a one-to-one correspondence.

32. The process of claim 30 wherein said predetermined correspondence is a one-to-many correspondence.

33. The process of claim 30 wherein said identification includes said redirect server URL.

34. The process of claim 31, 32, or 33 wherein said hyper-link reference further includes data having a predetermined correspondence with said Web page element and wherein said first server system processes said data to account for notification of the selection of said hyper-link reference.

35. A process of providing advertisement selection information to a web server in response to client selections of advertisements provided in web pages, said process comprising the steps of:

a) providing an embedded URL in a web page coupled to an advertisement selectable by a client, said advertisement having a correspondence with a first server and said embedded URL including a URL corresponding to a second server and data including an identification of said first server;

b) providing a redirection message including a redirection URL corresponding to said first server where said redirection message is prepared by said second server based on said identification of said first server; and c) recording advertisement selection information derived from said data.

36. The process of claim 35 wherein said web page served to said client by a third server.

37. The process of claim 36 wherein said data is processed by said second server to obtain said redirection URL.

38. The process of claim 37 wherein said identification of said first server establishes a predetermined correspondence between said embedded URL and said first server.

39. The process of claim 38 wherein said predetermined correspondence is one-to-one.

\* \* \* \* \*